(12) United States Patent
Gaffney

(10) Patent No.: US 11,707,053 B1
(45) Date of Patent: Jul. 25, 2023

(54) AUTOMATED POULTRY WATERING SYSTEM

(71) Applicant: Shane M. Gaffney, Milford, TX (US)

(72) Inventor: Shane M. Gaffney, Milford, TX (US)

( * ) Notice: Subject to any disclaimer, the term of this patent is extended or adjusted under 35 U.S.C. 154(b) by 64 days.

(21) Appl. No.: 17/333,604

(22) Filed: May 28, 2021

Related U.S. Application Data

(60) Provisional application No. 63/031,759, filed on May 29, 2020.

(51) Int. Cl.
*A01K 39/024* (2006.01)
*A01K 39/02* (2006.01)

(52) U.S. Cl.
CPC .................................. *A01K 39/024* (2013.01)

(58) Field of Classification Search
CPC ...... A01K 39/024; A01K 39/00; A01K 39/02; A01K 39/0213; A01K 39/022; A01K 7/00; A01K 7/02; A01K 7/022; A01K 7/06; A01K 7/025; A01K 7/027; A01K 7/04; A01K 5/02; A01K 5/0216; A01K 5/0225; A01K 5/0233
See application file for complete search history.

(56) References Cited

U.S. PATENT DOCUMENTS

| | | | | |
|---|---|---|---|---|
| 1,523,046 A | * | 1/1925 | Berrien | A01K 7/04 251/295 |
| 2,512,510 A | * | 6/1950 | Wartes | A01K 7/027 119/73 |
| 2,710,593 A | * | 6/1955 | Lippi | A01K 9/00 119/71 |
| 4,149,491 A | * | 4/1979 | Martin | A01K 7/06 119/75 |
| 5,099,798 A | * | 3/1992 | Ohara | A01K 39/0213 119/80 |
| 5,682,836 A | * | 11/1997 | Gustin | A01K 7/027 119/73 |

\* cited by examiner

*Primary Examiner* — Kristen C Hayes
(74) *Attorney, Agent, or Firm* — Kenneth L. Tolar

(57) ABSTRACT

An automated poultry watering system includes a hollow water tank having a bottom wall, at least one outer wall and an open top in communication within an internal water reservoir. Mounted on the outer wall are a plurality of watering stations for providing fresh water to poultry. Each watering station includes a bowl and a spring-biased lever that, when depressed, opens a valve to allow water from the reservoir to flow into the bowl. Within the reservoir is a refill valve that replenishes the tank with water from a municipal water source whenever the water level drops below a predetermined level.

14 Claims, 5 Drawing Sheets

AUTOMATED POULTRY WATERING SYSTEM

CROSS REFERENCE TO RELATED APPLICATIONS

This application claims priority of provisional application number 63/031,759 filed on May 29, 2020, the specification of which is incorporated herein by reference.

BACKGROUND OF THE INVENTION

The present invention relates to a system for automatically providing fresh water to poultry.

DESCRIPTION OF THE PRIOR ART

Poultry farming is labor intensive, particularly if the farmer is cultivating a large number of birds. One of the more burdensome tasks is maintaining a consistent supply of fresh drinking water for the birds to readily consume. A conventional poultry watering system typically includes a water reservoir with a plurality of water cups peripherally positioned thereon. The reservoir must be manually refilled with a garden hose or other water source that often must be transported to the watering location. In addition, existing watering systems are not equipped to handle a high-pressure water supply. Therefore, the conventional systems rely upon gravity feed to refill the cups. Furthermore, because the water cups on existing systems are not self-cleaning, they must be manually cleaned often, which is laborious and aggravating. And since the reservoirs are not sealed, so they must also be cleaned frequently as well.

Accordingly, there is currently a need for an improved poultry watering system that overcomes the disadvantages of existing watering devices. The present invention satisfies that need by providing a watering system having a reservoir that is automatically refilled by a municipal water supply when depleted below a predetermined level. Moreover, the system includes an automated water dispensing mechanism that flushes and fills a water bowl in response to engagement by a bird.

SUMMARY OF THE INVENTION

The present invention relates to an automated poultry watering system comprising a hollow water tank having a bottom wall, at least one outer wall and an open top in communication within an internal water reservoir. Mounted on the outer wall are a plurality of watering stations for providing fresh water to poultry. Each watering station includes a bowl and a spring-biased lever that, when depressed, opens a valve to allow water from the reservoir to flow into the bowl. Within the reservoir is a refill valve that replenishes the tank with water from a municipal water source whenever the water level drops below a predetermined level.

It is therefore an object of the present invention to provide a watering system for poultry that automatically replenishes a reservoir with fresh water.

It is therefore another object of the present invention to provide a watering system for poultry that automatically rinses and refills a drinking bowl.

It is yet another object of the present invention to provide an automated poultry watering system having a sealed water tank that will not allow debris intrusion.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
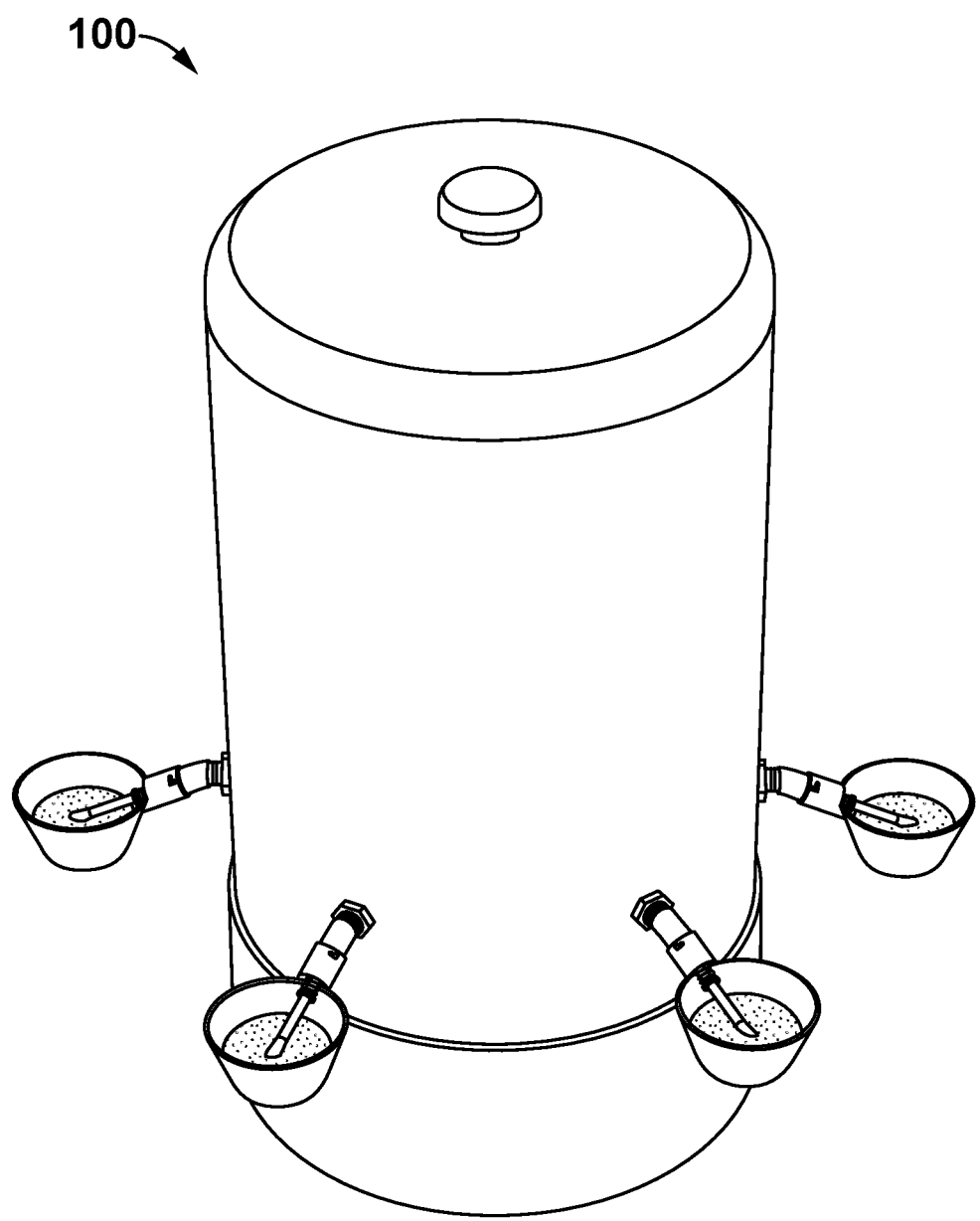
FIG. 1 is a top, perspective view of the automated watering system according to the present invention.
Figure 2:
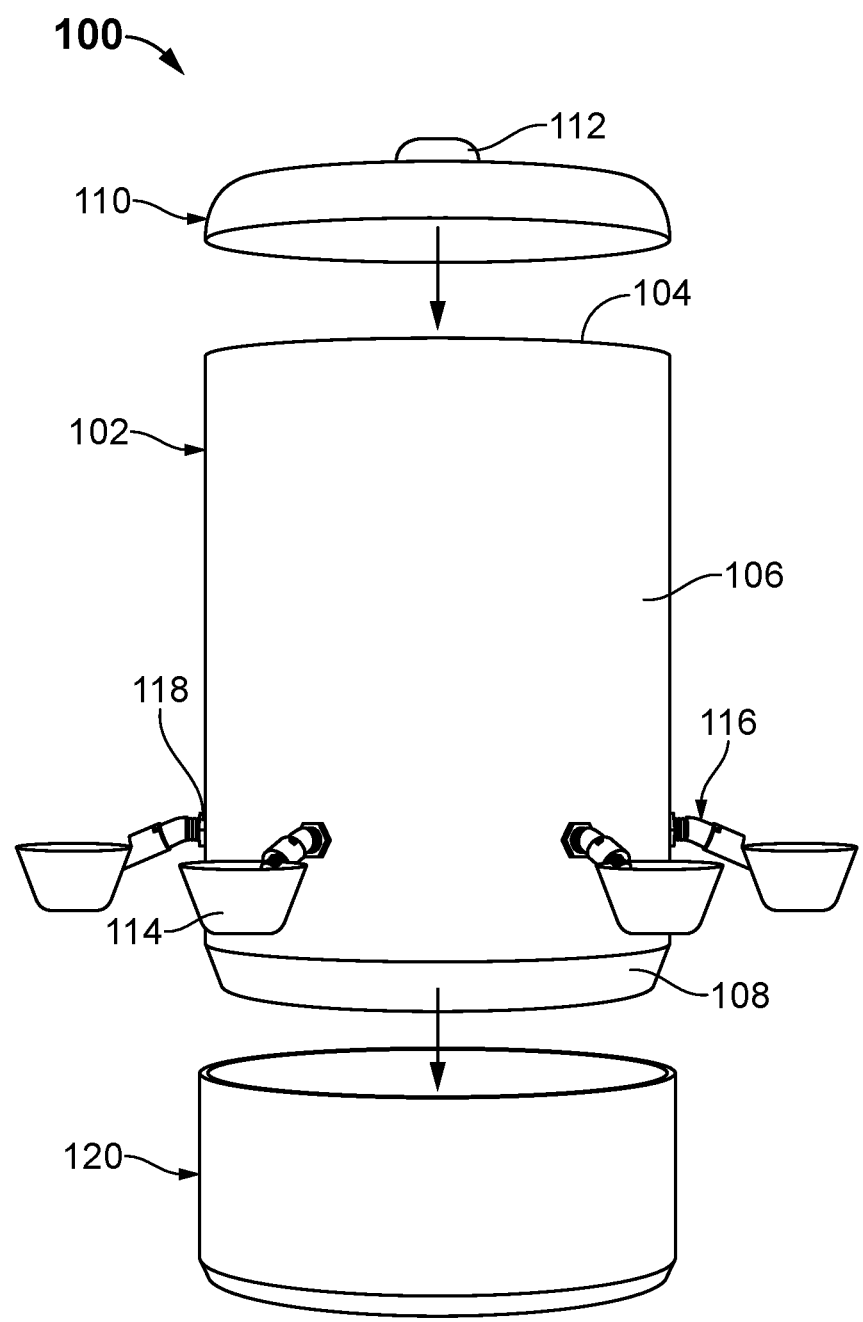
FIG. 2 is an exploded view of the automated watering system.
Figure 3:
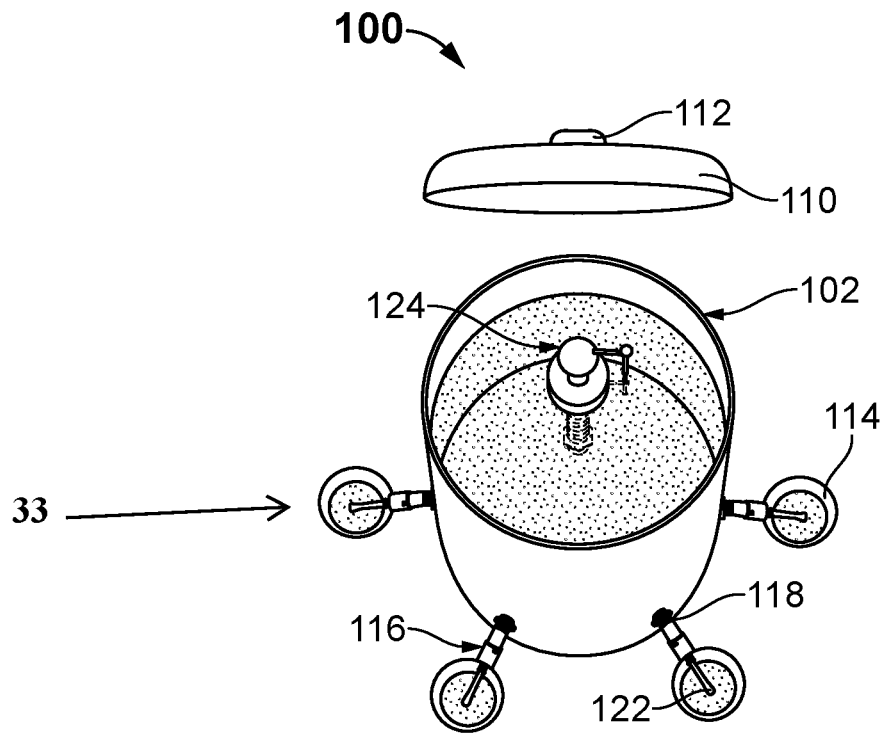
FIG. 3 is a top view of the water tank with the lid removed.
Figure 4:
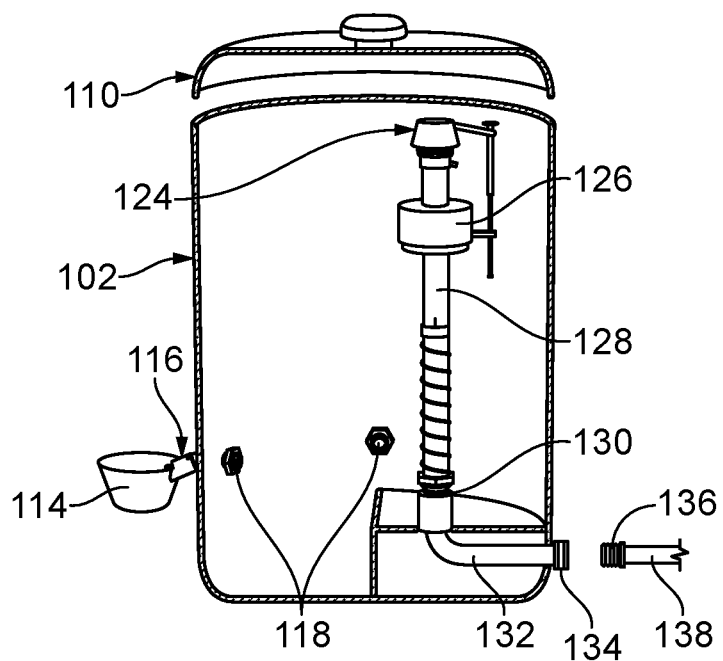
FIG. 4 is a cross-sectional view of the water tank.
Figure 5:
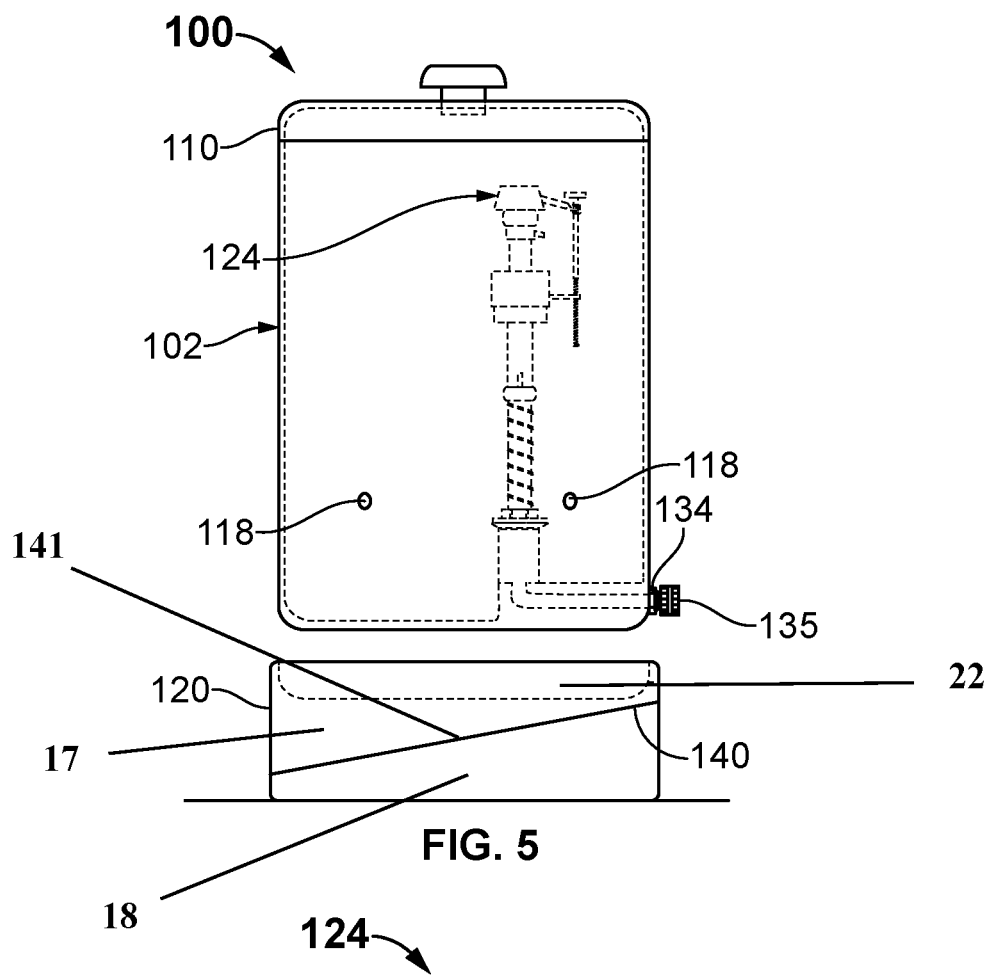
FIG. 5 is an isolated view of the water tank and base.
Figure 6:
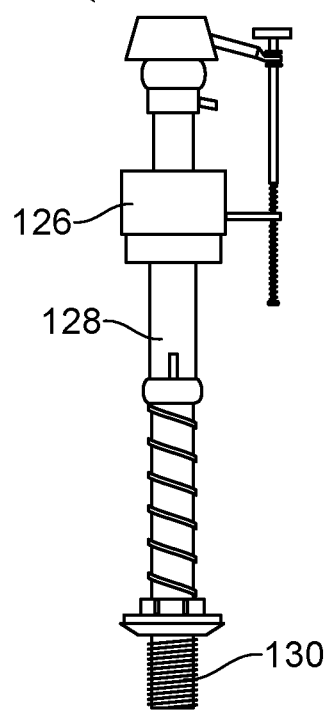
FIG. 6 is an isolated view of the refill valve.
Figure 7:
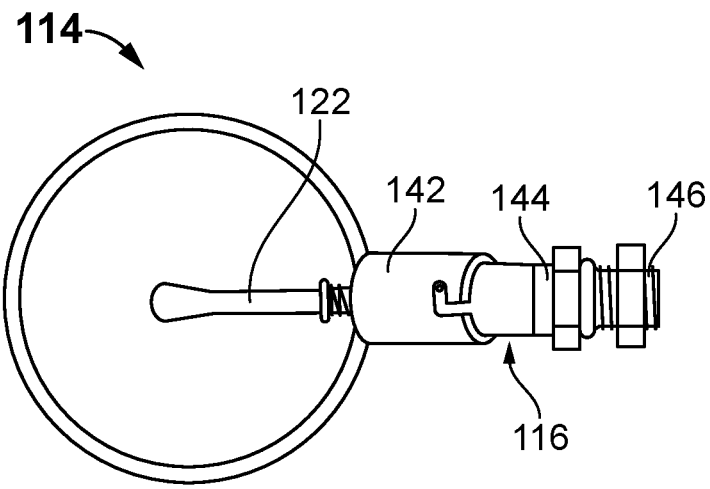
FIG. 7 is a top, isolated view of an exemplary watering station.

The present invention relates to an automated poultry watering system 100 comprising a hollow water tank 102 having a bottom wall 108, at least one outer wall 106 and an open top 104 in communication within an internal water reservoir 55. The tank is removably positioned within an adjustable base 120 to elevate the tank above an underlying surface. The base is formed of an upper section 17 having a chamfered lower surface 141 and an independently rotatable lower section 18 having a chamfered upper surface 140. The chamfered surfaces 140, 141 mutually engage such that when one of the sections is rotated relative to the other, the height of the base is varied to adjust the elevation of the tank. The upper section includes a cavity 22 that is dimensioned and configured to firmly receive the bottom wall of the tank.

Figure 8:
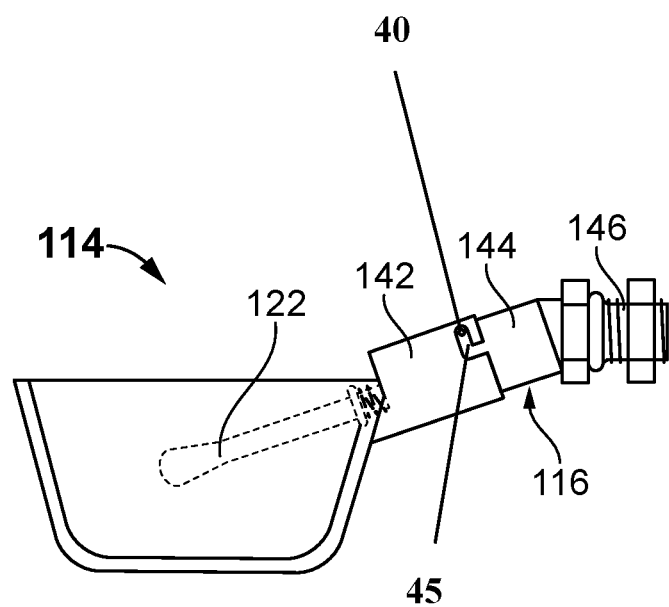
FIG. 8 is a side view of the watering station of FIG. 8.

Mounted on the outer wall are a plurality of watering stations 33 for providing fresh water to poultry. Each watering station includes a bowl 114 connected to the tank with a threaded conduit 116 that is connected to threaded ports 118 on the tank outer wall to establish fluid communication between the bowl and the internal reservoir. Referring specifically to FIG. 8, the conduit 116 is formed of a twist-lock mechanism including a first section 142 connected at one end to the water bowl and at an opposing end to a second section 144. The second section 144 includes a nipple 40 that is inserted into an L-shaped slot 45 and the first section is rotated to lock the two components 142, 144 together. The end of the second section 144 opposite the nipple 40 is configured to mate with the threaded ports 118 on the outer wall. The conduit 116 preferably extends downwardly at a predetermined angle to position the bowl at a more accessible location. Furthermore, the height of the watering stations can be varied within a predetermined range by rotating the base sections 140, 141 described, supra. Extending from the conduit into the bowl is a spring-biased lever 122 that, when depressed, opens an internal low-pressure valve to allow water from the reservoir to flow into the bowl. Gradually, fowl learn to peck on the lever 122 to fill the bowl with fresh water. The water will flow in a swirling pattern to rinse the interior surface of the bowl and to flush out any debris.

Mounted within the reservoir is a threaded fitting 230 that is connected to an elbow 132 proximal the bottom wall of the tank. A distal end of the elbow 132 extends through a reinforced opening 134 on the outer wall and includes threaded collar 135 that is configured to couple with the threaded connector 136 found on most conventional garden hoses 138. Removably coupled with the fitting is a refill valve 124 similar to that found in household toilet water tanks. The refill valve 124 includes a tubular shaft 128 having a threaded lower end 130 for coupling with the fitting 230. Slidably mounted on the shaft is a float valve 126 that moves upwardly and downwardly with the existing reservoir water level. When the float valve 126 drops to a predetermined level, it opens an internal valve that allows water from the municipal water source (garden hose 138) to freely flow into the reservoir until the water level reaches a second predetermined level. Accordingly, a farmer never needs to manually replenish the reservoir.

Superimposed on the open top of the tank is a lid 110 that snap-fits to the tank outer wall to form an air-impermeable seal. The lid further includes an internal O-ring or gasket that prevents dust and debris intrusion. The lid includes an air vent 112 that allows the reservoir pressure to equilibrate as the water level drops. The vent includes a washable foam filter that allows clean, filtered air to enter the reservoir while blocking dust and other airborne particles.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An automated watering system comprising:
   a hollow water tank having a bottom wall, at least one outer wall and an open top in communication with an internal water reservoir;
   a plurality of watering stations mounted on the outer wall for providing fresh water to poultry, each of said watering stations including a bowl in select fluid communication with said reservoir;
   a spring-biased lever within said bowl that opens a valve to allow water to flow from said reservoir to said bowl;
   a lid removably snapped onto the open top of said tank to form an air-impermeable seal, said lid including an air vent that equalizes air pressure within said reservoir as a water level within said reservoir drops.

2. The automated watering system according to claim 1 further comprising:
   a refill valve positioned within said reservoir and in fluid communication with a water source;
   a level sensor in communication with said refill valve that opens said valve when a level of water within said reservoir decreases below a predetermined level.

3. The automated watering system according to claim 2 wherein said refill valve includes a tubular shaft having a float valve slidably mounted thereon.

4. The automated watering system according to claim 1 wherein said air vent includes a washable foam filter that allows clean, filtered air to enter the reservoir while blocking airborne particles.

5. The automated watering system according to claim 1 wherein said tank is removably positioned within an adjustable base to elevate said tank above an underlying surface.

6. The automated watering system according to claim 5 wherein said adjustable base comprises:
   an upper section having a chamfered lower surface;
   a lower section having a chamfered upper surface, the chamfered lower surface engaging the chamfered upper surface such that when the upper section is rotated relative to the lower section, a height of the base is varied to adjust the elevation of the tank.

7. The automated watering system according to claim 6 wherein the upper section includes a cavity that is dimensioned and configured to receive the bottom wall of said tank.

8. An automated watering system comprising:
   a hollow water tank having a bottom wall, at least one outer wall and an open top in communication with an internal water reservoir, said tank removably positioned within an adjustable base to elevate said tank above an underlying surface;
   a plurality of watering stations mounted on the outer wall for providing fresh water to poultry, each of said watering stations including a bowl in select fluid communication with said reservoir;
   a spring-biased lever within said bowl that opens a valve to allow water to flow from said reservoir to said bowl.

9. The automated watering system according to claim 8 further comprising:
   a refill valve positioned within said reservoir and in fluid communication with a water source;
   a level sensor in communication with said refill valve that opens said valve when a level of water within said reservoir decreases below a predetermined level.

10. The automated watering system according to claim 9 wherein said refill valve includes a tubular shaft having a float valve slidably mounted thereon.

11. The automated watering system according to claim 8 further comprising a lid removably snapped onto the open top of said tank to form an air-impermeable seal.

12. The automated watering system according to claim 11 wherein said lid includes an air vent that equalizes air pressure within said reservoir as a water level within said reservoir drops.

13. The automated watering system according to claim 12 wherein said air vent includes a washable foam filter that allows clean, filtered air to enter the reservoir while blocking airborne particles.

14. The automated watering system according to claim 8 wherein said adjustable base comprises:
   an upper section having a chamfered lower surface;
   a lower section having a chamfered upper surface, the chamfered lower surface engaging the chamfered upper surface such that when the upper section is rotated relative to the lower section, a height of the base is varied to adjust the elevation of the tank.

* * * * *